(12) United States Patent
Choi et al.

(10) Patent No.: US 8,592,083 B2
(45) Date of Patent: *Nov. 26, 2013

(54) NEGATIVE ELECTRODE AND NEGATIVE ACTIVE MATERIAL FOR RECHARGEABLE LITHIUM BATTERY, AND RECHARGEABLE LITHIUM BATTERY INCLUDING SAME

(75) Inventors: Nam-Soon Choi, Yongin-si (KR); Kyoung-Han Ryu, Yongin-si (KR); Su-Yeong Park, Yongin-si (KR); Doo-Kyoung Lee, Yongin-si (KR); Sang-Min Lee, Yongin-si (KR); Wan-Uk Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 248 days.

This patent is subject to a terminal disclaimer.

(21) Appl. No.: 13/236,373

(22) Filed: Sep. 19, 2011

(65) Prior Publication Data

US 2012/0009468 A1   Jan. 12, 2012

Related U.S. Application Data

(63) Continuation of application No. 12/182,013, filed on Jul. 29, 2008.

(30) Foreign Application Priority Data

Nov. 22, 2007 (KR) .................. 10-2007-0119902
Feb. 21, 2008 (KR) .................. 10-2008-0015839

(51) Int. Cl.
    *H01M 4/62*   (2010.01)
(52) U.S. Cl.
    USPC .................. 429/217; 429/231.95; 429/231.9; 429/218.1; 429/209; 429/231.2; 429/128; 252/182.1; 427/58

(58) Field of Classification Search
    USPC .............. 429/218.1, 231.95, 231.9, 217, 209, 429/231.2, 128; 252/182.1; 427/58
    See application file for complete search history.

(56) References Cited

U.S. PATENT DOCUMENTS 7,396,612 B2   7/2008   Ohata et al.
7,553,587 B2   6/2009   Watanabe
(Continued)

FOREIGN PATENT DOCUMENTS

CN   1663065 A     8/2005
EP   1 947 714 A1  7/2008
(Continued)

OTHER PUBLICATIONS

Winter et al., *Insertion Electrode Materials for Rechargeable Lithium Batteries*, Advanced Materials, vol. 10, No. 10, Jan. 1998, pp. 725-763, XP 002947071.
Zhang, S.S., et al., *Enhanced performance of natural graphite in Li-ion battery by oxalatoborate coating*, Journal of Power Sources, vol. 129, (2004), pp. 275-279.

(Continued)

*Primary Examiner* — Laura Weiner
(74) *Attorney, Agent, or Firm* — Christie, Parker & Hale, LLP

(57) ABSTRACT

Negative active materials, negative electrodes, and rechargeable lithium batteries are provided. A negative electrode according to one embodiment includes a non-carbon-based active material, a lithium salt having an oxalatoborate structure, and a high-strength polymer binder. The negative active material may include a non-carbon-based material and a coating layer on the non-carbon-based material. The coating layer includes a lithium salt having an oxalatoborate structure and a high-strength polymer binder. A rechargeable lithium battery including the negative electrode or negative active material has good cycle life characteristics and high capacity.

17 Claims, 3 Drawing Sheets

(56) References Cited

U.S. PATENT DOCUMENTS

| | | |
|---|---|---|
| 7,638,243 B2 | 12/2009 | Xu et al. |
| 7,754,390 B2 | 7/2010 | Takezawa et al. |
| 2005/0244711 A1 | 11/2005 | Fukui et al. |
| 2006/0263688 A1 | 11/2006 | Guyomard et al. |
| 2007/0072083 A1 | 3/2007 | Ikuta et al. |
| 2007/0128517 A1 | 6/2007 | Christensen et al. |
| 2007/0148544 A1 | 6/2007 | Le |
| 2007/0190407 A1 | 8/2007 | Fujikawa et al. |
| 2007/0196738 A1 | 8/2007 | Ohata et al. |
| 2008/0241697 A1 | 10/2008 | Imachi |
| 2009/0087748 A1 | 4/2009 | Choi et al. |
| 2009/0136848 A1 | 5/2009 | Minami et al. |
| 2010/0062340 A1 | 3/2010 | Ide |

FOREIGN PATENT DOCUMENTS

| | | |
|---|---|---|
| FR | 2852148 | 9/2004 |
| JP | 07-220759 | 8/1995 |
| JP | 2005-026203 | 1/2005 |
| JP | 2006-032325 | 2/2006 |
| JP | 2007-220321 | 8/2007 |
| JP | 4053576 B2 | 2/2008 |
| JP | 2008-053206 | 3/2008 |
| JP | 2008-270160 | 11/2008 |
| JP | 2008-135382 * | 6/2009 |
| JP | 4667242 B2 | 4/2011 |
| KR | 10-2005-0027224 | 3/2005 |
| KR | 10-2006-0030898 | 4/2006 |
| KR | 10-2007-0030487 | 3/2007 |
| KR | 10-0721500 B1 | 5/2007 |
| WO | WO 02/061872 A1 | 8/2002 |
| WO | WO 2007/094641 | 8/2007 |

OTHER PUBLICATIONS

SIPO Office action dated Nov. 19, 2010 in corresponding Chinese Patent application 200810180727.7, with English translation.
SIPO Office action dated Jun. 7, 2011 in corresponding Chinese Patent application 200810180727.7, with English translation.
European Search Report dated Feb. 25, 2009 in corresponding European application 08169976.1.
KIPO Office action dated Feb. 26, 2010 in priority Korean application 10-2008-0015839.
KIPO Notice of Allowance dated Aug. 26, 2010 in priority Korean application 10-2008-0051839.
U.S. Office action dated Apr. 23, 2010 in U.S. Appl. No. 12/324,952.
U.S. Office action dated Aug. 24, 2010 in U.S. Appl. No. 12/324,952.
U.S. Notice of Allowance dated Dec. 27, 2010 in U.S. Appl. No. 12/324,952.
U.S. Notice of Allowance dated Mar. 23, 2012, cross reference U.S. Appl. No. 12/324,952, 11 pages.
U.S. Notice of Allowance dated May 5, 2011, for cross reference U.S. Appl. No. 12/182,013, 8 pages.
U.S. Notice of Allowance dated Mar. 16, 2012, for cross reference U.S. Appl. No. 12/182,013, pages.
U.S. Notice of Allowance dated Mar. 12, 2012, for cross reference U.S. Appl. No. 13/236,373, 7 pages.
Japanese Office action dated Mar. 6, 2012, for Japanese Patent application 2008-302319, 2 pages.
Patent Abstracts of Japan, and English machine translation of Japanese Publication 2007-220321, listed above, 18 pages.
U.S. Notice of Allowance dated Apr. 24, 2013, for parent U.S. Appl. No. 12/182,013, (9 pages).
U.S. Office action dated Oct. 3, 2013 in cross-reference U.S. Appl. No. 12/324,952 (9 pages).

* cited by examiner

NEGATIVE ELECTRODE AND NEGATIVE ACTIVE MATERIAL FOR RECHARGEABLE LITHIUM BATTERY, AND RECHARGEABLE LITHIUM BATTERY INCLUDING SAME

CROSS-REFERENCES TO RELATED APPLICATIONS

This application is a continuation of application Ser. No. 12/182,013 filed on Jul. 29, 2008, which claimed priority to and the benefit of Korean Patent Application No. 10-2007-0119902 filed in the Korean Intellectual Property Office on Nov. 22, 2007, and Korean Patent Application No. 10-2008-0015839 filed in the Korean Intellectual Property Office on Feb. 21, 2008, the entire contents of which are incorporated herein by reference.

BACKGROUND OF THE INVENTION

1. Field of the Invention

The present invention relates to negative electrodes, negative active materials for rechargeable lithium batteries, and rechargeable lithium batteries including the same.

2. Description of the Related Art

Lithium rechargeable batteries have recently drawn attention as power sources for small portable electronic devices. They use organic electrolyte solutions and thus have twice the discharge voltage of conventional batteries using alkali aqueous solutions, and accordingly have high energy densities.

For positive active materials of rechargeable lithium batteries, lithium-transition element composite oxides capable of intercalating lithium, such as $LiCoO_2$, $LiMn_2O_4$, $LiNiO_2$, $LiNi_{1-x}CO_xO_2$ (0<x<1), and so on have been used.

As for negative active materials of rechargeable lithium batteries, various carbon-based materials, such as artificial graphite, natural graphite, and hard carbon, all of which can intercalate and deintercalate lithium ions, have been used. However, non-carbon-based negative active materials, such as Si, have also been researched in an effort to obtain high stability and high-capacity.

SUMMARY OF THE INVENTION

One embodiment of the present invention provides a negative electrode and a negative active material for a rechargeable lithium battery having improved cycle life characteristics and high capacity.

Another embodiment of the present invention provides a negative electrode for a rechargeable lithium battery including the negative electrode or negative active material.

The embodiments of the present invention are not limited to the above technical purposes, and a person of ordinary skill in the art will recognize other technical purposes.

According to one embodiment of the present invention, a negative electrode for a rechargeable lithium battery includes a non-carbon-based active material, a lithium salt having an oxalatoborate structure, and a high-strength polymer binder.

According to another embodiment of the present invention, a negative active material for a rechargeable lithium battery includes a non-carbon-based material, and a coating layer on the non-carbon-based material. The coating layer includes a lithium salt having an oxalatoborate structure and a high-strength polymer binder.

According to yet another embodiment of the present invention, a rechargeable lithium battery includes the negative electrode, a positive electrode including a positive active material, and an electrolyte including a lithium salt and a non-aqueous solvent.

According to still another embodiment of the present invention, a rechargeable lithium battery includes a negative electrode including the negative active material, a positive electrode including a positive active material, and an electrolyte including a lithium salt and a non-aqueous solvent.

The lithium salt having an oxalatoborate structure may be represented by the following Formula 1:

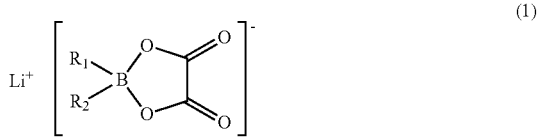

In Formula 1, $R_1$ and $R_2$ may be the same or different and may each be independently selected from halogens and halogenated alkyls. In another embodiment, both $R_1$ and $R_2$ are OCO, and are linked to form a cyclic ring including B. The halogen may be F, Cl, I, or Br. The alkyl may be a C1 to C10 alkyl, and the halogenated alkyl may include $CF_3$, $CF_2CF_3$, $CH_2CF_3$, or $CFHCHF_2$.

Nonlimiting examples of suitable lithium salts having an oxalatoborate structure include $LiB(C_2O_4)_2$ (lithium bis(oxalato)borate), LiBOB, $LiB(C_2O_4)_2F_2$ (lithiumdifluoro oxalatoborate), LiFOB, and combinations thereof.

The non-carbon-based active material can be selected from lithium vanadium oxide, Si, silicon oxide ($SiO_x$ (0<x<2)), Si—Y alloys (where Y is an element selected from alkali metals, alkaline-earth metals, group 13 elements, group 14 elements, transition elements, rare earth elements, and combinations thereof, where Y is not Si), Sn, $SnO_2$, Sn—Y alloys (where Y is an element selected from alkali metals, alkaline-earth metals, group 13 elements, group 14 elements, transition elements, rare earth elements, and combinations thereof, where Y is not Sn), and combinations thereof.

The element Y can be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Ge, P, As, Sb, Bi, S, Se, Te, Po, and combinations thereof.

The rechargeable lithium battery including the negative electrode or negative active material has good cycle life characteristics and high capacity.

DETAILED DESCRIPTION OF THE INVENTION

Figure 1:
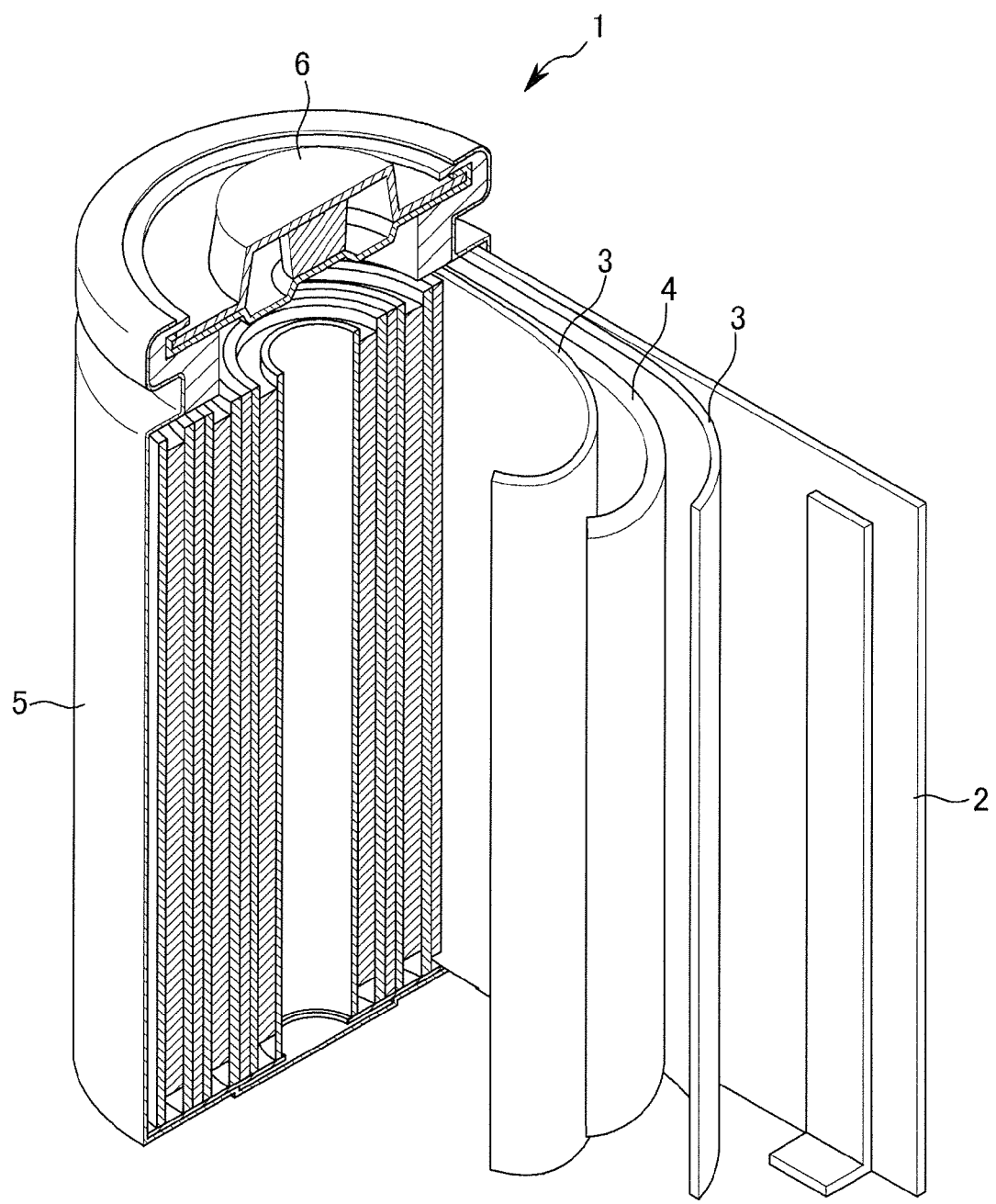
FIG. 1 is a perspective cross-sectional view of a rechargeable lithium battery according to one embodiment of the present invention.

According to embodiments of the present invention, negative electrodes for rechargeable lithium batteries are provided. The negative electrodes include non-carbon-based negative active materials.

Recently, studies on non-carbon-based negative active materials (such as Si) having higher capacities than carbon-based negative active materials have progressed. However, rechargeable lithium batteries including non-carbon-based negative active materials (such as Si) undergo irreversible reactions in which the Si negative active materials dissolve during repeated charge and discharge cycles, thereby remarkably deteriorating cycle life characteristics.

According to one embodiment of the present invention, cycle-life deterioration is substantially prevented by employing lithium salts having oxalatoborate structures as negative electrodes. On the other hand, the lithium salt having an oxalatoborate structure should not be used for the positive electrode since oxalato borate anions have low oxidation resistance which allows oxidation decomposition at low potential to generate electric current. Thus, when used as the positive electrode, the lithium salt having an oxalatoborate structure may remarkable deteriorate the cycle-life characteristics due to significant decomposition by oxidation.

The lithium salt having an oxalatoborate structure may be added to a negative electrode composition or may be coated directly on the negative active material.

In one embodiment, the lithium salt having an oxalatoborate structure is added in a negative electrode composition. The negative electrode includes a non-carbon-based negative active material, a lithium salt having an oxalatoborate structure, and a high-strength polymer binder.

The lithium salt having an oxalatoborate structure is represented by the following Formula 1:

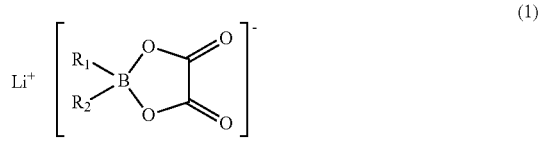

(1)

In Formula 1, $R_1$ and $R_2$ may be the same or different and may each be independently selected from halogens and halogenated alkyls. In another embodiment, both $R_1$ and $R_2$ are OCO, and are linked to form a cyclic ring including B. The halogen may be F, Cl, I, or Br. The alkyl may be a C1 to C10 alkyl. In one embodiment, the alkyl may be a C1 to C4 alkyl. The halogenated alkyl may include $CF_3$, $CF_2CF_3$, $CH_2CF_3$, or $CFHCHF_2$.

Nonlimiting examples of suitable lithium salts having oxalatoborate structures include $LiB(C_2O_4)_2$ (lithium bis(oxalato) borate), LiBOB, $LiB(C_2O_4)_2F_2$ (lithium difluoro oxalatoborate), LiFOB, and combinations thereof.

Such a lithium salt having an oxalatoborate structure is reduction-decomposed by reduction at around 1.7 V (vs. Li/Li$^+$) at initial charge, forming a rigid and stable coating layer having a carbonate group and a network structure on the surface of the non-carbon-based negative active material. When LiBOB is used as the lithium salt having an oxalatoborate structure, the coating layer including the carbonate group is formed according to the following Reaction Scheme 1:

Reaction Scheme 1

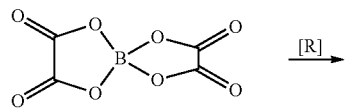 [R]→

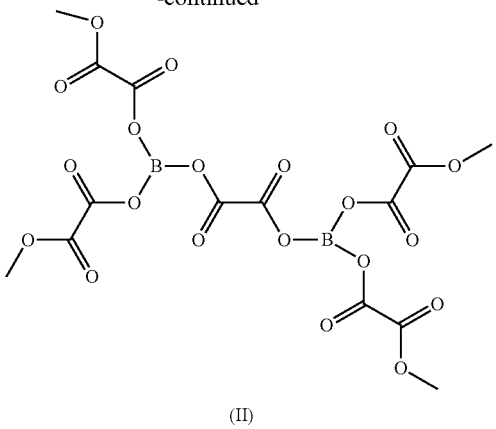

(II)

The coating layer including a carbonate group can improve charge and discharge characteristics since the dissociated lithium ion concentration is high enough to readily mobilize lithium ions through the coating layer.

The coating layer is a rigid and stable coating layer having a network structure to prevent it breaking during charge and discharge. Accordingly, the coating layer formed at the initial charge stage can prevent electrode capacity deterioration and battery OCV imperfections that are caused by lithium salts (such as LiPF$_6$) used in the electrolyte solution that generate strong acids (such as HF) during charge and discharge. The strong acid (e.g., HF) attacks the negative active material, thereby decomposing the active material surface so that the non-carbon-based active materials crack at room temperature (and particularly at high temperatures) and elute into the electrolyte in the form of the following structure.

Structure

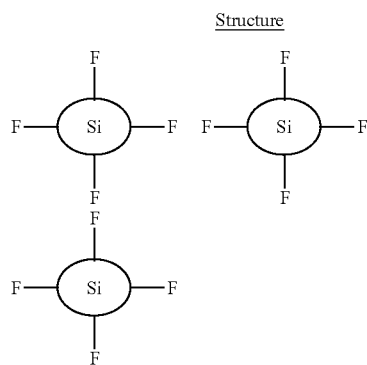

Furthermore, the coating layer can substantially prevent the organic solvent from excessive decomposition caused by reduction during charging and discharging which causes lithium carbonate (Li$_2$CO$_3$) to grow on the surface of negative active material, forming an increasingly thick coating layer such that the negative active material reaction is deteriorated.

The cycle-life characteristics are improved by using lithium salts having oxalatoborate structures, but are not improved by using a lithium salt such as LiBF$_4$. This is because the lithium salt such as LiBF$_4$ cannot form a coating layer having a carbonate group.

The cycle-life characteristics are improved by employing lithium salts having oxalatoborate structures for the negative electrode. However, if the lithium salt having the oxalatoborate structure is employed as the positive electrode, cycle life characteristics are not improved, and the thermal stability of the positive active material is deteriorated.

According to one embodiment, the amount of the lithium salt having an oxalatoborate structure ranges from about 0.1 to about 10 parts by weight based on 100 parts by weight of the binder. According to another embodiment, the amount ranges from about 1 to about 5 parts by weight based on 100 parts by weight of the binder. When the amount of the lithium salt having an oxalato borate structure is less than about 0.1 parts by weight, the negative active material surface is not effectively covered with the stable coating layer, and the non-carbon-based active material elutes and cracks. When the amount of the lithium salt having an oxalato borate structure is more than about 10 parts by weight, the coating layer formed by the reduction decomposition of the lithium salt having the oxalato borate structure is excessively thick, increasing battery resistance and deteriorating high rate characteristics and cycle life characteristics.

The high-strength polymer may act as a binder, and may be selected from polyamide imides, polyimides, polyacrylonitrile, carboxy methyl cellulose, cross-linked copolymers of polyacrylic acid and carboxy methyl cellulose, and combinations thereof. The cross-linked copolymer of polyacrylic acid and carboxy methylcellulose forms a matrix by thermal cross-linking. According to one embodiment, the polymer includes a high-strength polymer. When the polymer is a polymer such as polyvinylidene fluoride having no strength, it is difficult to improve cycle life characteristics, electrical resistance increases are suppressed by maintaining the electrical network in the electrode, and maximization of electrode utilization is difficult to achieve.

According to one embodiment, the high-strength polymer has a weight average molecular weight ranging from about 10,000 to about 1,000,000. According to another embodiment, the weight average molecular weight ranges from about 50,000 to about 500,000. When the high-strength polymer has a molecular weight that is too high, it is hard to dissolve the polymer binder in a binder solution. On the other hand, when the molecular weight is too low, it deteriorates the mechanical strength of the binder so that it is hard to control electrode volume expansion, thereby remarkably deteriorating battery resistance and cycle life characteristics.

According to one embodiment, the amount of the high-strength polymer binder ranges from about 3 to about 15 wt %. According to another embodiment, the amount of the high-strength polymer binder ranges from about 5 to about 10 wt %.

When the amount of the high-strength polymer binder is less than about 3 wt %, it is hard to prepare the negative electrode, but when the amount is more than about 15 wt %, the loading level of the active material is decreased in the electrode, thereby deteriorating battery capacity.

The non-carbon-based active material can be selected from lithium vanadium oxide, Si, silicon oxide ($SiO_x$ ($0<x<2$)), Si—Y alloys (where Y is an element selected from alkali metals, alkaline-earth metals, group 13 elements, group 14 elements, transition elements, rare earth elements, and combinations thereof, where Y is not Si), Sn, $SnO_2$, Sn—Y alloys (where Y is an element selected from alkali metals, alkaline-earth metals, group 13 elements, group 14 elements, transition elements, rare earth elements, and combinations thereof, where Y is not Sn), and combinations thereof. The element Y can be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Ge, P, As, Sb, Bi, S, Se, Te, Po, and combinations thereof.

In one embodiment, the negative electrode of the present invention further includes a conductive material. Any electrically conductive material may be used as a conductive material unless so long as it does not cause a chemical change. Nonlimiting examples of suitable conductive materials include natural graphite, artificial graphite, carbon black, acetylene black, ketjen black, carbon fibers, metal powders or metal fibers including copper, nickel, aluminum, silver, and so on, and polyphenylene derivatives.

In addition, the negative electrode includes a current collector supporting the negative active material layer. The current collector may be selected from copper foils, nickel foils, stainless steel foils, titanium foils, nickel foams, copper foams, polymer substrates coated with a conductive metal, and combinations thereof.

According to another embodiment, a negative active material is coated with a lithium salt having an oxalatoborate structure, and the negative active material includes a non-carbon-based material and a coating layer formed on the non-carbon-based material. The coating layer is formed on the non-carbon-based material surface, and includes a lithium salt having an oxalatoborate structure and a high-strength polymer.

The non-carbon-based material, the lithium salt and the high-strength polymer are the same as described above.

The lithium salt having an oxalatoborate structure is added in an amount ranging from about 0.005 to about 1 part by weight based on 100 parts by weight of the non-carbon-based material. According to another embodiment, the lithium salt is added in an amount ranging from about 0.005 to about 0.1 parts by weight. According to another embodiment, the lithium salt is added in an amount ranging from about 0.01 to about 0.05 parts by weight. When the amount of the lithium salt having an oxalatoborate structure is less than about 0.005 parts by weight, it does not effectively cover the surface of the negative active material with the stable coating layer, and the non-carbon-based active material elutes and cracks. On the other hand, when the amount of the lithium salt is more than about 1 part by weight, it forms a thick coating layer by reduction decomposition of the lithium salt having an oxalatoborate structure, thereby increasing battery resistance and deteriorating high rate characteristics and cycle life characteristics.

According to one embodiment, the mixing ratio of the lithium salt having an oxalato borate structure and the high-strength polymer ranges from about 0.5:100 to about 10:100 parts by weight. According to another embodiment, the mixing ratio ranges from about 1:100 to about 5:100 parts by weight. When the amount of the lithium salt having an oxalatoborate structure is less than about 0.5 parts by weight, it does not effectively cover the surface of the negative active material with the stable coating layer, thereby causing the silicon to elute or crack. On the other hand, when the amount of the lithium salt is more than about 10 parts by weight, the coating layer formed by the reduction decomposition of the lithium salt having an oxalatoborate structure is excessively thick, increasing battery resistance and deteriorating high rate characteristics and cycle life characteristics.

According to one embodiment, the thickness of the coating layer ranges from about 10 nm to about 50 nm. According to another embodiment, the thickness of the coating layer ranges from about 10 nm to about 30 nm. When the thickness of the coating layer is less than about 10 nm, electrode resistance is increased. On the other hand, when the thickness is greater than about 50 nm, the lithium salt having an oxalato borate structure and the high-strength polymer do not perform effectively.

The high-strength polymer formed on the active material surface may act as a binder. However, the negative electrode includes a binder, and a current collector, and optionally a conductive agent as described above. The binder, the conductive material and the current collector are the same as described above.

According to embodiments of the present invention, improvements in the cycle life characteristics of rechargeable lithium batteries including non-carbon-based negative active materials may be achieved by adding a lithium salt having an oxalatoborate structure to the negative active material composition during preparation of the negative electrode, or by coating the lithium salt with the oxalatoborate structure directly on the negative active material surface. In contrast, the cycle-life characteristics are rarely improved when the lithium salt is added to the electrolyte solution, but are improved when the lithium salt is added in the negative active material composition or coated directly on the negative active material surface as in embodiments of the present invention.

The negative active material according to one embodiment in which the lithium salt having an oxalatoborate structure is added to the negative active material is prepared in the same manner as is commonly known for the preparation of negative electrodes. That is, the non-carbon-based material, a lithium salt having an oxalato borate structure, a high-strength polymer binder and a solvent are mixed to prepare a negative active material composition, and the composition is coated on a current collector.

The negative active material according to another embodiment in which the lithium salt with the oxalatoborate structure is coated on the negative active material may be prepared by first coating a non-carbon-based material with a coating solution. The coating solution includes a lithium salt having an oxalatoborate structure, a high-strength polymer, and a solvent. The solvent may be selected from N-methylpyrrolidone (NMP), dimethylformamide (DMF), dimethylsulfoxide (DMSO), H$_2$O, and combinations thereof. The concentration of the coating solution may range from about 10 to about 20 wt %. That is, the coating solution is prepared by mixing from about 80 to about 90 wt % of a solvent and from about 10 to 20 wt % of the lithium salt having an oxalatoborate structure and the high-strength polymer.

Coating may be performed by screen printing, spray coating, dipping, or doctor blade coating, but is not limited thereto.

Then, the non-carbon-based material coated with the coating solution is dried to provide a negative active material coated with the coating layer. The drying process is performed at a temperature ranging from about 110 to about 200° C. According to another embodiment, the drying temperature ranges from about 120 to about 150° C. The drying process may be performed under a vacuum atmosphere.

The solvent of the coating solution is evaporated and removed during the drying process so that only the lithium salt and high-strength polymer remain in the provided coating layer.

The negative electrodes according to embodiments of the invention can be applied to rechargeable lithium batteries. The rechargeable lithium battery also includes a positive electrode and an electrolyte.

The positive electrode includes a current collector and a positive active material layer disposed on the current collector. The positive active material may be a lithiated intercalation compound that is capable of intercalating and deintercalating lithium ions. Nonlimiting examples of suitable lithiated intercalation compounds include composite oxides including lithium and a metal selected from cobalt, manganese, nickel, and combinations thereof. The lithiated intercalation compound may be a compound selected from compounds represented by the following Formulas 2 to 24.

$$Li_aA_{1-b}B_bD_2 \tag{2}$$

In Formula 2, $0.95 \leq a \leq 1.1$ and $0 \leq b \leq 0.5$.

$$Li_aE_{1-b}B_bO_{2-c}F_c \tag{3}$$

In Formula 3, $0.95 \leq a \leq 1.1$, $0 \leq b \leq 0.5$, and $0 \leq c \leq 0.05$.

$$LiE_{2-b}B_bO_{4-c}F_c \tag{4}$$

In Formula 4, $0 \leq b \leq 0.5$ and $0 \leq c \leq 0.05$.

$$Li_aNi_{1-b-c}Co_bBcD_\alpha \tag{5}$$

In Formula 5, $0.95 \leq a \leq 1.1$, $0 \leq b \leq 0.5$, $0 \leq c \leq 0.05$, and $0 < \alpha \leq 2$.

$$Li_aNi_{1-b-c}Co_bB_cO_{2-\alpha}F_\alpha \tag{6}$$

In Formula 6, $0.95 \leq a \leq 1.1$, $0 \leq b \leq 0.5$, $0 \leq c \leq 0.05$, and $0 < \alpha < 2$.

$$Li_aNi_{1-b-c}Co_bB_cO_{2-\alpha}F_2 \tag{7}$$

In Formula 7, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cD_\alpha \tag{8}$$

In Formula 8, $0.95 \leq a \leq 1.1$, $0 \leq b \leq 0.5$, $0 \leq c \leq 0.05$, and $0 < \alpha \leq 2$.

$$Li_aNi_{1-b-c}Mn_bB_cO_{2-\alpha}F_\alpha \tag{9}$$

In Formula 9, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cO_{2-\alpha}F_2 \tag{10}$$

In Formula 10, $0.95 \leq a \leq 1.1$, $0 \leq b \leq 0.5$, $0 \leq c \leq 0.05$, and $0 < \alpha < 2$.

$$Li_aNi_bE_cG_dO_2 \tag{11}$$

In Formula 11, $0.90 \leq a \leq 1.1$, $0 \leq b \leq 0.9$, $0 \leq c \leq 0.5$, and $0.001 \leq d \leq 0.1$.

$$Li_aNi_bCo_cMn_dG_eO_2 \tag{12}$$

In Formula 12, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aAG_bO_2 \tag{13}$$

In Formula 13, $0.90 \leq a \leq 1.1$ and $0.001 \leq b \leq 0.1$.

$$Li_aMn_2G_bO_4 \tag{14}$$

In Formula 14, $0.90 \leq a \leq 1.1$ and $0.001 \leq b \leq 0.1$.

$$QO_2 \tag{15}$$

$$QS_2 \tag{16}$$

$$LiQS_2 \tag{17}$$

$$V_2O_5 \tag{18}$$

$$LiV_2O_5 \tag{19}$$

$$LiIO_2 \tag{20}$$

$$LiNiVO_4 \tag{21}$$

$$Li_{(3-f)}J_2PO_{43}(0 \leq f < 3) \tag{22}$$

$$Li_{(3-f)}Fe_2PO_{43}(0 \leq f \leq 2) \tag{23}$$

$$LiFePO_4 \tag{24}$$

In the above Formulas 2 to 24, A is selected from Ni, Co, Mn, and combinations thereof. B is selected from Al, Ni, Co, Mn, Cr, Fe, Mg, Sr, V, rare earth elements, and combinations thereof. D is selected from O, F, S, P, and combinations thereof. E is selected from Co, Mn, and combinations thereof. F is selected from F, S, P, and combinations thereof. G is an element selected from Al, Cr, Mn, Fe, Mg, La, Ce, Sr, V, and combinations thereof. Q is selected from Ti, Mo, Mn, and combinations thereof. I is selected from Cr, V, Fe, Sc, Y, and combinations thereof. J is selected from V, Cr, Mn, Co, Ni, Cu, and combinations thereof.

The positive active material may include the positive active material and a coating layer, or a compound of the active material and a coated active material coated with the coating layer. The coating layer may include at least one coating element compound selected from oxides and hydroxides of the coating element, oxyhydroxides of the coating element, oxycarbonates of the coating element, and hydroxycarbonates of the coating element. The compound for the coating layer may be either amorphous or crystalline. The coating element included in the coating layer may be selected from Mg, Al, Co, K, Na, Ca, Si, Ti, V, Sn, Ge, Ga, B, As, Zr, and combinations thereof. The coating process may include any conventional process as long as it does not cause side effects to the properties of the positive active material. Nonlimiting examples of suitable coating techniques include spray coating and immersion. The coating processes are well known to persons having ordinary skill in the art.

The positive active material layer further includes a binder and a conductive material. The binder improves the binding properties of the positive active material particles to each other and to the current collector. Nonlimiting examples of suitable binders include polyvinyl alcohol, hydroxypropyl cellulose, diacetylene cellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, etc., and combinations thereof.

The conductive material improves electrical conductivity of the positive electrode. Any electrically conductive material can be used as the conductive agent so long as it does not cause chemical change. Nonlimiting examples of suitable conductive materials include natural graphite, artificial graphite, carbon black, acetylene black, ketjen black, carbon fibers, metal powders or metal fibers including copper, nickel, aluminum, silver, and so on, and polyphenylene derivatives.

The current collector may be Al, but is not limited thereto.

The positive electrode may be fabricated by first mixing the active material, a binder, and conductive agent to prepare a positive active material composition. The positive active material composition is then coated on a current collector. The method of manufacturing the electrode is well known in the art. The solvent may include N-methylpyrrolidone, but it is not limited thereto.

The rechargeable lithium battery includes a non-aqueous electrolyte including a non-aqueous organic solvent and a lithium salt. The non-aqueous organic solvent acts as a medium for transmitting ions taking part in the electrochemical reaction of the battery.

The non-aqueous organic solvent may include a carbonate-based, ester-based, ether-based, ketone-based, alcohol-based, or aprotic solvent. Nonlimiting examples of suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Nonlimiting examples of suitable ester-based solvents include n-methyl acetate, n-ethyl acetate, n-propyl acetate, dimethylacetate, methylpropionate, ethylpropionate, y-butyrolactone, decanolide, valerolactone, mevalonolactone, caprolactone, and so on. Nonlimiting examples of suitable ether-based solvents include dibutyl ether, tetraglyme, diglyme, dimethoxyethane, 2-methyltetrahydrofuran, tetrahydrofuran, and so on. Nonlimiting examples of suitable ketone-based solvents include cyclohexanone, and so on. Nonlimiting examples of suitable alcohol-based solvents include ethyl alcohol, isopropyl alcohol, and so on. Nonlimiting examples of suitable aprotic solvents include nitriles (such as R—CN where R is a C2 to C20 linear, branched, or cyclic hydrocarbon, a double bond, an aromatic ring, or an ether bond), amides (such as dimethylformamide), dioxolanes (such as 1,3-dioxolane), sulfolanes, and so on.

A single non-aqueous organic solvent may be used, or a mixture of solvents may be used. When a mixture of solvents is used, a mixture ratio can be controlled in accordance with desirable battery performance.

The carbonate-based solvent may include a mixture of cyclic carbonates and linear carbonates. The cyclic carbonate and linear carbonates may be mixed together in a volume ratio ranging from about 1:1 to about 1:9, and when the mixture is used as an electrolyte, electrolyte performance may be enhanced.

In addition, the electrolyte may further include mixtures of carbonate-based solvents and aromatic hydrocarbon-based solvents. The carbonate-based solvents and the aromatic hydrocarbon-based solvents may be mixed together in a volume ratio ranging from about 1:1 to about 30:1.

The aromatic hydrocarbon-based organic solvent may be represented by the following Formula 25:

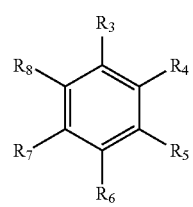

(25)

In Formula 25, each of $R_3$ to $R_8$ is independently selected from hydrogen, halogens, C1 to C10 alkyls, C1 to C10 haloalkyls, and combinations thereof.

Nonlimiting examples of suitable aromatic hydrocarbon-based organic solvents include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The electrolyte may further include vinylene carbonate or an ethylene carbonate-based compound represented by the following Formula 26:

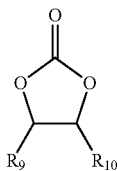

(26)

In Formula 26, each of $R_9$ and $R_{10}$ is independently selected from hydrogen, halogens, cyano (CN) groups, nitro ($NO_2$) groups, and C1 to C5 fluoroalkyl groups. $R_9$ and $R_{10}$ are not both hydrogen.

Nonlimiting examples of suitable ethylene carbonate-based compounds include difluoroethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving cycle-life may be adjusted within an appropriate range.

The lithium salt supplies lithium ions in the battery, facilitates the basic operation of the rechargeable lithium battery, and improves lithium ion transport between the positive and negative electrodes. Nonlimiting examples of suitable lithium salts include $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, lithium bisoxalato borate, and combinations thereof. The concentration of the lithium salt may range from about 0.1 to 2.0M concentration. When the lithium salt concentration is less than about 0.1M, electrolyte performance may be deteriorated due to low electrolyte conductivity. When the lithium salt concentration is greater than about 2.0M, lithium ion mobility may be reduced due to increased electrolyte viscosity.

The rechargeable lithium battery may further include a separator between the negative electrode and the positive electrode, as needed. Nonlimiting examples of suitable separator materials include polyethylene, polypropylene, polyvinylidene fluoride, and multi-layers thereof, such as polyethylene/polypropylene double-layered separators, polyethylene/polypropylene/polyethylene triple-layered separators, and polypropylene/polyethylene/polypropylene triple-layered separators.

FIG. 1 illustrates a rechargeable lithium battery according to one embodiment of the present invention. Referring to FIG. 1, a cylindrical rechargeable lithium battery 1 includes a negative electrode 2, a positive electrode 3, a separator 4 between the negative electrode 2 and the positive electrode 3, an electrolyte impregnating the separator 4, a battery case 5, and a sealing member 6 sealing the battery case 5.

The following examples are presented for illustrative purposes only and do not limit the scope of the present invention.

Example 1

A Si negative active material, lithium bis(oxalato) borate, a polyamide imide binder, and a carbon black conductive material were mixed in an N-methylpyrrolidone solvent to provide a negative active material slurry composition. The lithium bis(oxalato) borate was added in an amount of 1 part by weight based on 100 parts by weight of the polyamide imide binder. The mixing ratio of the Si negative active material, the lithium bis(oxalato) borate, and the polyamide imide binder was 92.93:0.07:7 by wt %. The weight average molecular weight of the polyamide imide was 100,000.

The negative active material slurry composition was coated on a copper current collector to provide a negative electrode.

A $LiCoO_2$ positive active material, a polyvinylidene fluoride binder, and an acetylene black conductive material were mixed in an N-methylpyrrolidone solvent at a weight ratio of 94:3:3 to provide a positive active material slurry composition. The slurry composition was coated on an Al current collector to provide a positive electrode.

Using the negative electrode, the positive electrode, and an electrolyte solution in which 1M $LiPF_6$ lithium salt was dissolved in a mixed non-aqueous solvent (50:50 volume ratio) of ethylene carbonate and diethyl carbonate, a rechargeable lithium cell was fabricated.

Example 2

A rechargeable lithium cell was fabricated as in Example 1, except that the lithium bis(oxalato) borate was added in an amount of 5 parts by weight based on 100 parts by weight of the polyamide imide binder.

Example 3

A rechargeable lithium cell was fabricated as in Example 1, except that the polyamide imide polymer had a weight average molecular weight of 500,000.

Example 4

Si was coated with a coating solution including lithium bis(oxalato) borate, polyamide imide and an N-methylpyrrolidone solvent. The lithium bis(oxalato) borate was added in an amount of 1 part by weight based on 100 parts by weight of the Si, and the mixing ratio of lithium bis(oxalato) borate and polyamide imide was 0.9:9.1 wt %. The weight average molecular weight of the polyamide imide was 500,000.

Subsequently, the Si coated with the coating solution was dried at 120° C. to provide a negative active material having a coating layer.

The negative active material, the polyamide imide binder, and the carbon black conductive material were dissolved in an N-methylpyrrolidone solvent to provide a negative active material slurry composition.

The negative active material slurry composition was coated on a copper current collector to provide a negative electrode.

Using the negative electrode, a positive electrode including a $LiCoO_2$ positive active material, and an electrolyte solution of 1M $LiPF_6$ lithium salt dissolved in an ethylene carbonate non-aqueous solvent, a rechargeable lithium cell was provided.

Comparative Example 1

A Si negative active material and polyamide imide were mixed in an N-methylpyrrolidone solvent to provide a negative active material slurry composition. The mixing ratio of the Si negative active material and the polyamide imide binder was 93:7 by wt %. The polyamide imide had a weight average molecular weight of 500,000.

The negative active material slurry composition was coated on a copper current collector to provide a negative electrode.

Using the negative electrode, a positive electrode including a $LiCoO_2$ positive active material, and an electrolyte solution, a rechargeable lithium cell was fabricated. The electrolyte solution was prepared by adding lithium bis(oxalato) borate in an ethylene carbonate non-aqueous solvent with 1M $LiPF_6$ lithium salt dissolved therein. The lithium bis(oxalato) borate was added in an amount of 2 parts by weight based on 100 parts by weight of the non-aqueous solvent.

Comparative Example 2

A rechargeable lithium cell was fabricated as in Example 1 except that lithium bis(oxalato) borate was not added to the negative active material composition.

Comparative Example 3

A rechargeable lithium cell was fabricated as in Example 1, except that $LiBF_4$ was used instead of lithium bis(oxalato) borate.

Comparative Example 4

A rechargeable lithium cell was fabricated as in Example 1, except that polyvinylidene fluoride was used instead of polyamide imide.

Comparative Example 5

A $LiCoO_2$ positive active material, lithium bis(oxalato) borate, a polyvinylidene fluoride binder, and an acetylene black conductive material were mixed in an N-methylpyrrolidone solvent to provide a positive active material slurry composition. The lithium bis(oxalato) borate was added in an amount of 5 parts by weight based on 100 parts by weight of the binder. The mixing ratio of the $LiCoO_2$ positive active material, the lithium bis(oxalato) borate, and the polyvinylidene fluoride binder was 92.93:0.07:7 by wt %. The polyvinylidene fluoride had a weight average molecular weight of 400,000.

The positive active material slurry composition was coated on an Al current collector to provide a positive electrode.

A Si negative active material, a polyvinylidene fluoride binder and an acetylene black conductive material were mixed in an N-methylpyrrolidone solvent at a weight ratio of 94:3:3 to provide a negative active material slurry composition. The negative active material slurry composition was coated on a copper current collector to provide a negative electrode.

Using the positive electrode, the negative electrode, and an electrolyte solution of 1M $LiPF_6$ lithium salt dissolved in a mixed non-aqueous solvent (50:50 volume ratio) of ethylene carbonate and diethyl carbonate, a rechargeable lithium cell was fabricated.

Figure 2:
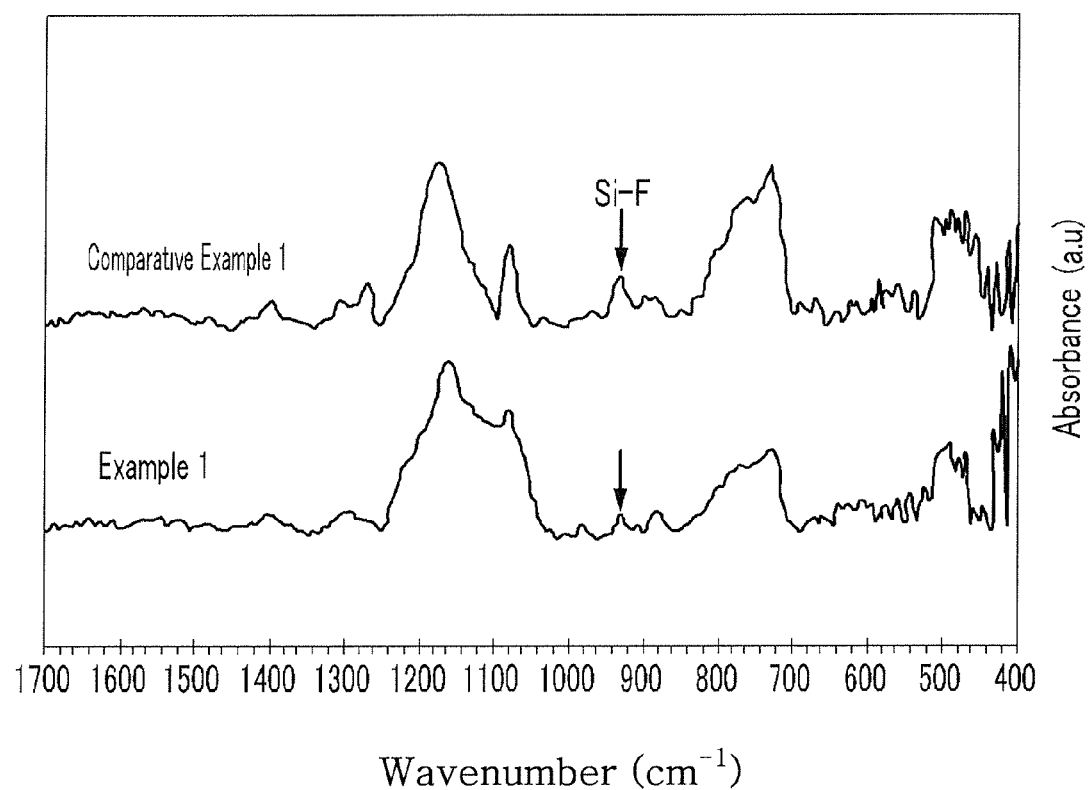
FIG. 2 is a graph of FT-IR measurement results of negative electrodes prepared according to Example 1 and Comparative Example 1.

The negative electrodes according to Example 1 and Comparative Example 1 were subjected to FT-IR measurements, and the results are shown in FIG. 2. As shown in FIG. 2, the negative electrode according to Example 1 including lithium bis(oxalato) borate had a weak Si—F linkage peak, and the negative electrode according to Comparative Example 1 including no lithium bis(oxalato) borate had a strong Si—F linkage peak. As a result, it is believed that the lithium bis (oxalato) borate could effectively suppress the silicon eluting phenomenon due to Si—F formation.

Figure 3:
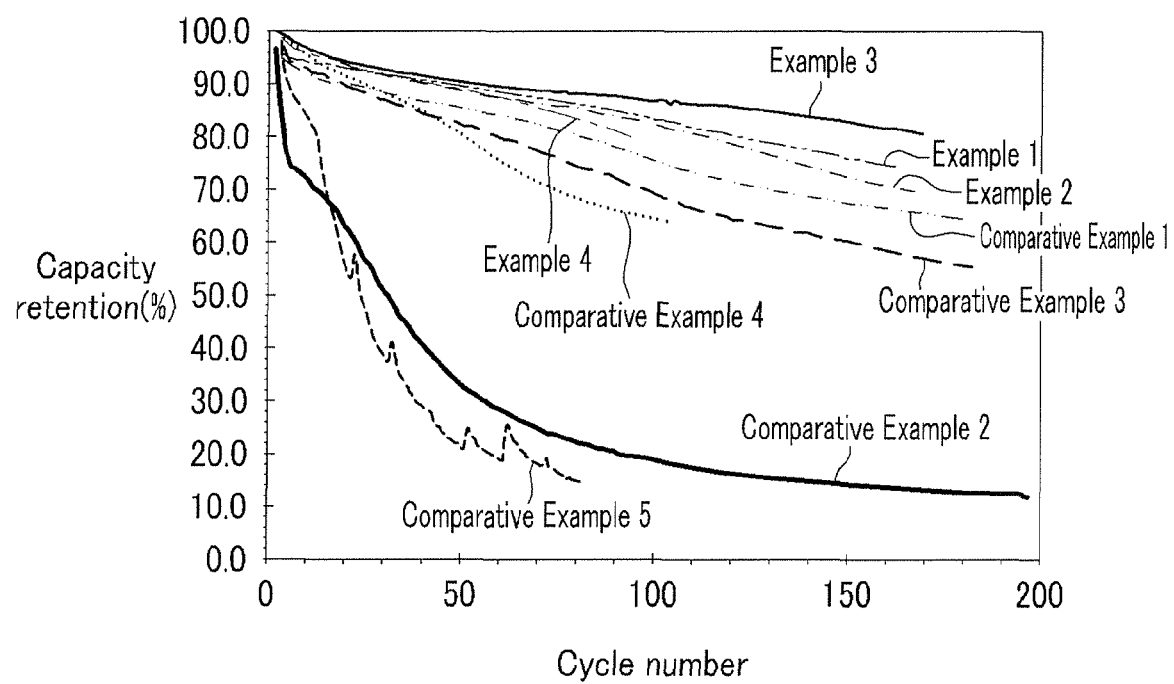
FIG. 3 is a graph of capacity retention rates of rechargeable lithium cells prepared according to Examples 1 to 4 and Comparative Examples 1 to 5.

Further, the rechargeable lithium cells prepared according to Examples 1 to 4 and Comparative Examples 1 to 5 were charged and discharged 200 times, where charging was performed at 0.8 C and discharging at 1.0 C to determine capacity retention rates (cycle life characteristics). The results are shown in FIG. 3. As shown in FIG. 3, the rechargeable lithium cells according to Examples 1 to 4 had better cycle-life characteristics than those of the cells prepared according to Comparative Examples 1 to 5. Comparative Example 1 without a lithium salt having an oxalato borate structure, and a conductive agent exhibited poorer results than those of Examples 1 to 4. The addition of the conductive agent to the cell without the lithium salt having an oxalato borate structure (Comparative Example 2) causes abrupt fading of the cycle life characteristics so that the cell cannot be used as a battery.

Comparative Example 3 adding $LiBF_4$ as a lithium salt to the negative active material composition exhibits much poorer results than those of the cells prepared according to Examples 1 to 4. In addition, Comparative Example 4 using polyvinylidene fluoride having no or low strength exhibits poorer results than those of the cells prepared according to Examples 1 to 4.

Comparative Example 5 in which lithium bis(oxalato) borate was used in the positive active material composition exhibits the worst cycle life characteristics. It is evident from the results that if the lithium salt having an oxalato borate structure is used in the positive electrode, improvements in cycle life characteristics cannot be obtained.

While the present invention has been illustrated and described with reference to certain exemplary embodiments, it will be understood by those of ordinary skill in the art that various modifications may be made to the described embodiments without departing from the spirit and scope of the present invention as defined by the following claims.

What is claimed is:

1. A negative active material for a rechargeable lithium battery, comprising:

a non-carbon-based active material; and a layer on the non-carbon-based active material, wherein the layer comprises a lithium salt having an oxalatoborate structure and a high-strength polymer binder, wherein a polymer of the high-strength polymer binder is selected from the group consisting of polyamide imides, polyimides, polyacrylonitrile, carboxymethylcellulose, cross-linking copolymers of polyacrylic acid and carboxymethyl cellulose, and combinations thereof, and wherein the non-carbon-based active material is selected from the group consisting of:

lithium vanadium oxide,

Si, silicon oxides represented $SiO_x$ wherein $0<x<2$,

Si-Y alloys wherein Y is an element selected from the group consisting of alkali metals, alkaline-earth metals, group 13 elements, group 14 elements, transition elements, rare earth elements, and combinations thereof, and wherein Y is not Si, Sn, $SnO_2$, Sn-Y alloys wherein Y is an element selected from the group consisting of alkali metals, alkaline-earth metals, group 13 elements, group 14 elements, transition elements, rare earth elements, and combinations thereof, and wherein Y is not Sn, and combinations thereof.

2. The negative active material of claim 1, wherein the lithium salt having an oxalatoborate structure is represented by Formula 1:

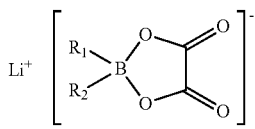

wherein $R_1$ and $R_2$ are the same or different and each of $R_1$ and $R_2$ is independently selected from the group consisting of halogens and halogenated alkyls.

3. The negative active material of claim 1, wherein the lithium salt having an oxalatoborate structure is represented by Formula 1:

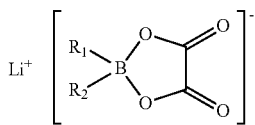

wherein both $R_1$ and $R_2$ are OCO, and are linked to form a cyclic ring including B.

4. The negative active material of claim 3, wherein the lithium salt having an oxalatoborate structure is selected from the group consisting of $LiB(C_2O_4)_2$ (lithium bis(oxalato) borate, LiBOB), $LiB(C_2O_4)F_2$ (lithiumdifluoro oxalatoborate, LiFOB), and combinations thereof.

5. The negative active material of claim 1, wherein the polymer of the high-strength polymer binder has a weight average molecular weight ranging from about 10,000 to about 1,000,000.

6. The negative active material of claim 1, wherein the lithium salt having an oxalatoborate structure is present in an amount ranging from about 0.005 to about 0.1 parts by weight based on 100 parts by weight of the non-carbon-based active material.

7. The negative active material of claim 1, wherein the lithium salt having an oxalatoborate structure and the high-strength polymer binder are present in a weight ratio ranging from about 0.5:100 to about 10:100.

8. The negative active material of claim 1, wherein the layer has a thickness ranging from about 10 nm to about 50 nm.

9. A rechargeable lithium battery comprising:
a negative electrode comprising a non-carbon-based active material; and a layer on the non-carbon-based active material, wherein the layer comprises a first lithium salt having an oxalatoborate structure and a high-strength polymer binder;
a positive electrode including a positive active material; and
an electrolyte including a second lithium salt and a non-aqueous solvent,
wherein a polymer of the high-strength polymer binder is selected from the group consisting of polyamide imides, polyimides, polyacrylonitrile, carboxymethylcellulose, cross-linking copolymers of polyacrylic acid and carboxymethyl cellulose, and combinations thereof, and
wherein the non-carbon-based active material is selected from the group consisting of:
lithium vanadium oxide,
Si,
silicon oxides represented by $SiO_x$ wherein $0<x<2$,
Si-Y alloys wherein Y is an element selected from the group consisting of alkali metals, alkaline-earth metals, group 13 elements, group 14 elements, transition elements, rare earth elements, and combinations thereof, and wherein Y is not Si,
Sn,
$SnO_2$,
Sn-Y alloys wherein Y is an element selected from the group consisting of alkali metals, alkaline-earth metals, group 13 elements, group 14 elements, transition elements, rare earth elements, and combinations thereof, and wherein Y is not Sn, and
combinations thereof.

10. The rechargeable lithium battery of claim 9, wherein the first lithium salt having an oxalatoborate structure is represented by Formula 1:

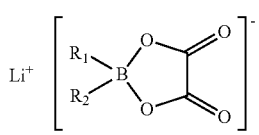

wherein $R_1$ and $R_2$ are the same or different, and each of $R_1$ and $R_2$ is independently selected from the group consisting of halogens and halogenated alkyls.

11. The rechargeable lithium battery of claim 9, wherein the first lithium salt having an oxalatoborate structure is represented by Formula 1:

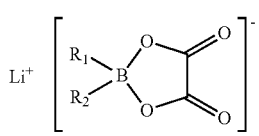

wherein both $R_1$ and $R_2$ are OCO, and are linked to form a cyclic ring including B.

12. The rechargeable lithium battery of claim 11, wherein the first lithium salt having an oxalatoborate structure is selected from the group consisting of $LiB(C_2O_4)_2$ (lithium bis(oxalato) borate, LiBOB), $LiB(C_2O_4)_2F_2$ (lithiumdifluoro oxalatoborate, LiFOB), and combinations thereof.

13. The rechargeable lithium battery of claim 9, wherein the polymer of the high-strength polymer binder has a weight average molecular weight ranging from about 10,000 to about 1,000,000.

14. The rechargeable lithium battery of claim 9, wherein the first lithium salt having an oxalatoborate structure is present in an amount ranging from about 0.005 to about 0.1 parts by weight based on 100 parts by weight of the non-carbon-based active material.

15. The rechargeable lithium battery of claim 9, wherein the layer has a thickness ranging from about 10nm to about 50nm.

16. The rechargeable lithium battery of claim 9, wherein the negative electrode further comprises a conductive material selected from the group consisting of natural graphite, artificial graphite, carbon black, acetylene black, ketjen black, carbon fibers, metal powders or metal fibers including copper, nickel, aluminum, silver, polyphenylene derivatives, and combinations thereof.

17. The rechargeable lithium battery of claim 9, wherein the second lithium salt is selected from the group consisting of $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ where x and y are natural numbers, LiCl, LiI, lithium bisoxalato borate, and combinations thereof.

* * * * *